United States Patent
Malik et al.

(10) Patent No.: US 10,540,984 B1
(45) Date of Patent: Jan. 21, 2020

(54) SYSTEM AND METHOD FOR ECHO CONTROL USING ADAPTIVE POLYNOMIAL FILTERS IN A SUB-BAND DOMAIN

(71) Applicant: Apple Inc., Cupertino, CA (US)

(72) Inventors: Sarmad Aziz Malik, Cupertino, CA (US); Arvindh Krishnaswamy, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 269 days.

(21) Appl. No.: 15/273,568

(22) Filed: Sep. 22, 2016

(51) Int. Cl.
*G10L 21/0232* (2013.01)
*G10L 21/0388* (2013.01)
*G10L 21/0208* (2013.01)

(52) U.S. Cl.
CPC ...... *G10L 21/0232* (2013.01); *G10L 21/0388* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 7,903,137 B2 | 3/2011 | Oxford et al. | |
| 8,687,797 B2 | 4/2014 | Zeng et al. | |
| 9,065,895 B2 | 6/2015 | Thyssen | |
| 2008/0162123 A1* | 7/2008 | Goldin | G10L 19/0204 704/205 |
| 2016/0086618 A1* | 3/2016 | Neoran | H04M 9/08 704/205 |
| 2016/0182770 A1* | 6/2016 | Ushakov | H04N 7/15 348/14.03 |

FOREIGN PATENT DOCUMENTS

| | | | | |
|---|---|---|---|---|
| WO | WO 2017099728 A1 * | 6/2017 | ............... | H04B 3/20 |
| WO | WO-2017099728 A1 * | 6/2017 | ............... | H04M 9/08 |

OTHER PUBLICATIONS

Fourier Expansion of Hammerstein Models for Nonlinear Acoustic System Identification, by Sarmad Malik and Gerald Enzner; 2011 IEEE, (ICASSP) pp. 85-88.
Adaptive Polynomial Filters, by John Mathews; IIEE PS Magazine; 1991; pp. 10-26.
A Variational Bayesian Learning Approach for Nonlinear Acoustic Echo Control, by Sarmad Malik, and ; Gerald Enzner, IEEE Transactions on Signal Processing, vol. 61, No. 23, Dec. 1, 2013; pp. 5853-5867.

* cited by examiner

*Primary Examiner* — Richa Mishra
(74) *Attorney, Agent, or Firm* — Womble Bond Dickinson (US) LLP

(57) ABSTRACT

Method for echo control using adaptive polynomial filters in sub-band domain starts with loudspeaker that is configured to be driven by a reference signal outputting a loudspeaker signal. Microphone receives at least one of: a near-end speaker signal, ambient noise signal, or the loudspeaker signal and generates a microphone signal. Adaptive polynomial filters in sub-band domain included in adaptive echo canceller (AEC) are configured to adaptively filter representation of the reference signal in a plurality of channels in a sub-band domain based on a clean signal to generate the echo estimate. Echo suppressor is configured to remove an echo estimate from the microphone signal to generate the clean signal. Other embodiments are described.

8 Claims, 11 Drawing Sheets

SYSTEM AND METHOD FOR ECHO CONTROL USING ADAPTIVE POLYNOMIAL FILTERS IN A SUB-BAND DOMAIN

FIELD

An embodiment of the invention relates generally to a system or electronic device that performs echo control using adaptive polynomial filters in a sub-band domain.

BACKGROUND

Currently, a number of consumer electronic devices are adapted to receive speech from a near-end talker (or environment) via microphone ports, transmit this signal to a far-end device, and concurrently output audio signals, including audio signals from the far-end talker, that are received from a far-end device. While the typical example is a portable telecommunications device (mobile telephone), with the advent of Voice over IP (VoIP), desktop computers, laptop computers and tablet computers may also be used to perform voice communications.

In these full-duplex communication devices, where both parties can communicate to the other simultaneously, the downlink signal that is output from the loudspeaker may be captured or acquired by the microphone. Accordingly, the downlink signal can then be sent back to the far-end device as echo. This echo occurs due to the natural acoustic/electrical/mechanical coupling between the microphone and the loudspeaker in electronic devices. The natural coupling may occur, for instance, when the microphone and the loudspeakers are in close proximity, when loud playback levels are being used, and when the microphones in the electronic devices are highly sensitive.

This echo, which can occur concurrently with the desired near-end speech, often renders the user's speech difficult to understand, and even unintelligible if such feedback loops through multiple near-end/far-end playback and acquisition cycles. Therefore, echo severely degrades the quality of the voice communication.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
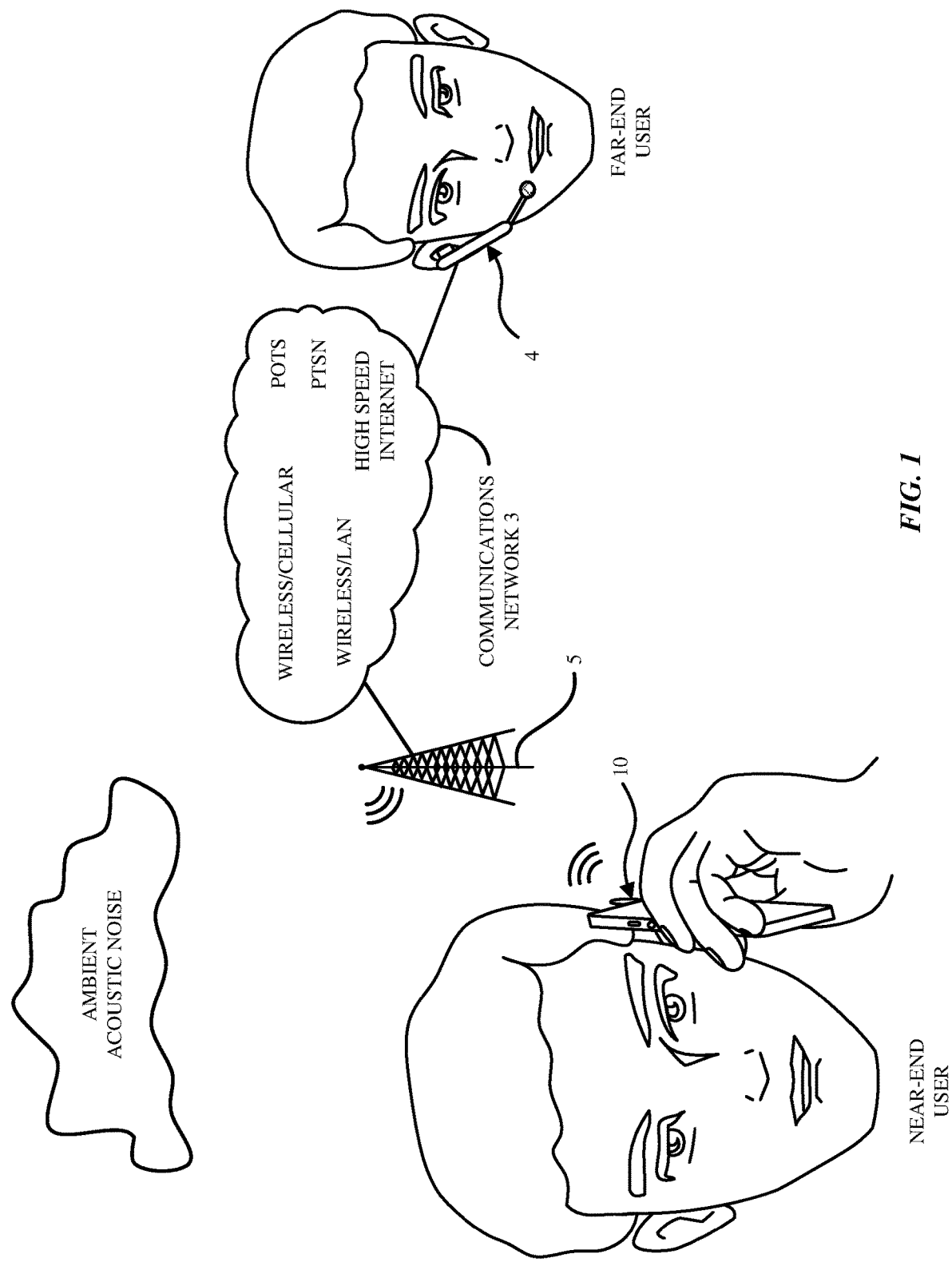
FIG. 1 illustrates an example of an electronic device in which an embodiment of the invention may be implemented.

FIG. 1 illustrates an instance of an electronic device 10 in which an embodiment of the invention may be implemented. As shown in FIG. 1, the electronic device 10 may be a mobile telephone communications device (or mobile device) or a smartphone. However, the electronic device 10 may also be, for instance, a desktop computer, a tablet computer, a personal digital media player, a notebook computer, and laptop computer. In the embodiment in FIG. 1, the near-end user is in the process of a call with a far-end user who is using another communications device 4. The term "call" is used here generically to refer to any two-way real-time or live audio communications session with a far-end user (including a video call which allows simultaneous audio). The electronic device 10 communicates with a wireless base station 5 in the initial segment of its communication link. The call, however, may be conducted through multiple segments over one or more communication networks 3, e.g. a wireless cellular network, a wireless local area network, a wide area network such as the Internet, and a public switch telephone network such as the plain old telephone system (POTS). The far-end user need not be using a mobile device, but instead may be using a landline based POTS or Internet telephony station.

As shown in FIG. 1, the device 1 may include a housing that includes a display screen 16 on the front face of the device 10. The display screen 16 may be a touch screen. The device 10 may also include input-output components such as ports and jacks. For example, the device 10 may include a first opening to form the microphone port and a second opening to form a speaker port. The sound during a telephone call is emitted through a third opening which forms a speaker port for a telephone receiver that is placed adjacent to the user's ear during a call. Further, when the device is used in speakerphone mode, for example, the openings may be used as speaker ports to output the audio signals. In some embodiments, the user may use a headset that includes a pair of earbuds and a headset wire. The user may place one or both the earbuds into his ears to receive the audio content.

The headset wire may also include a plurality of microphones to transmit his speech. As the user is using the headset to transmit his speech, environmental noise may also be present. Additionally, embodiments of the invention may also use other types of headsets. It is understood that single-earpiece or monaural headsets may also be used. The headset may include a pair of earcups that are placed over the user's ears may also be used. Additionally, embodiments of the present disclosure may also use other types of headsets. Further, in some embodiments, the earbuds may be wireless and communicate with each other and with the electronic device 10 via BlueTooth™ signals. Thus, the earbuds may not be connected with wires to the electronic device 10 or between them, but communicate with each other to deliver the uplink (or recording) function and the downlink (or playback) function.

The housing of the device 10 may include therein components such as a loudspeaker and at least one microphone. The loudspeaker is driven by an output downlink signal that includes the far-end acoustic signal components. The microphones may be air interface sound pickup devices that convert sound into an electrical signal. As the near-end user is using the electronic device 10 to transmit his speech, ambient noise may also be present. Thus, the microphone captures the near-end user's speech as well as the ambient noise around the electronic device 10. The downlink signal that is output from a loudspeaker may also be a part of the environmental noise that is captured by the microphone, and if so, the downlink signal that is output from the loudspeaker could get fed back in the near-end device's uplink signal to the far-end device's downlink signal. This downlink signal would in part drive the far-end device's loudspeaker, and thus, components of this downlink signal would include near-end device's uplink signal to the far-end device's downlink signal as echo.

In an effort to eliminate the echo from the far-end device's downlink signal, current solutions aim to use adaptive filters to slowly converge and cancel the downlink signal that is output from the near-end device's loudspeaker. However, these current solutions are ineffective because the loudspeaker in the electronic device is not a linear device. The output of the loudspeaker changes and becomes non-linear as the audio content being outputted changes. For instance, a sine wave at full amplitude at 300 Hz may cause non-linear problems while a sine wave at full amplitude at 2 kHz may not cause any non-linear problems. Further, the internal mechanical coupling of the loudspeaker may also be different for each frequency. For instance, each of the physical components in the electronic component may form a non-linear component that varies based on frequency of the outputted content. The physical components may include, for example, the SIM card tray, the camera spring, the vibration component, etc. Accordingly, the convergence of linear adaptive filters is dependent on the frequency of the outputted content as well as the physical components in the electronic device itself.

In order to address the non-linear phenomena, in embodiments of the invention, an adaptive echo canceller (AEC) that includes a plurality of adaptive polynomial filters in the sub-band domain or filter-bank domain. The adaptive polynomial filters are used to model the polynomial distortion that the system (or electronic device) is undergoing. In some embodiments, the system may use a Volterra model. In one embodiment, the AEC that includes the adaptive polynomial filters is placed after a linear adaptive filter to address the non-linear echo in the system. In dealing with nonlinear echo control, both the nonlinear modeling (i.e., Volterra or simple polynomial) as well as the domain in which one choses to learn this model are of equal importance. Classically, solutions have been developed in time, block-time, or block-frequency domain, and these solutions remain deficient in the context of effective and timely learning and cancellation of nonlinear phenomena. Here it must be noted that adaptive filters, in general, do not or cannot learn system response, rather adaptive filters learn the "domain-response" for a given system. This is why domain-selection, sub-band or filter-bank domain in this embodiment, is of supreme importance and is in fact the difference between a solution that works and the one that does not. Additionally, the adaptive polynomial filters are operated using adaptive algorithms. Examples of algorithms that may be used include Least Mean Square (LMS) algorithm, Normalized LMS (NLMS) algorithm, affine projection algorithm, Recursive Least Squares (RLS) algorithm, Kalman filtering in the sub-band domain, etc.

Figure 2:
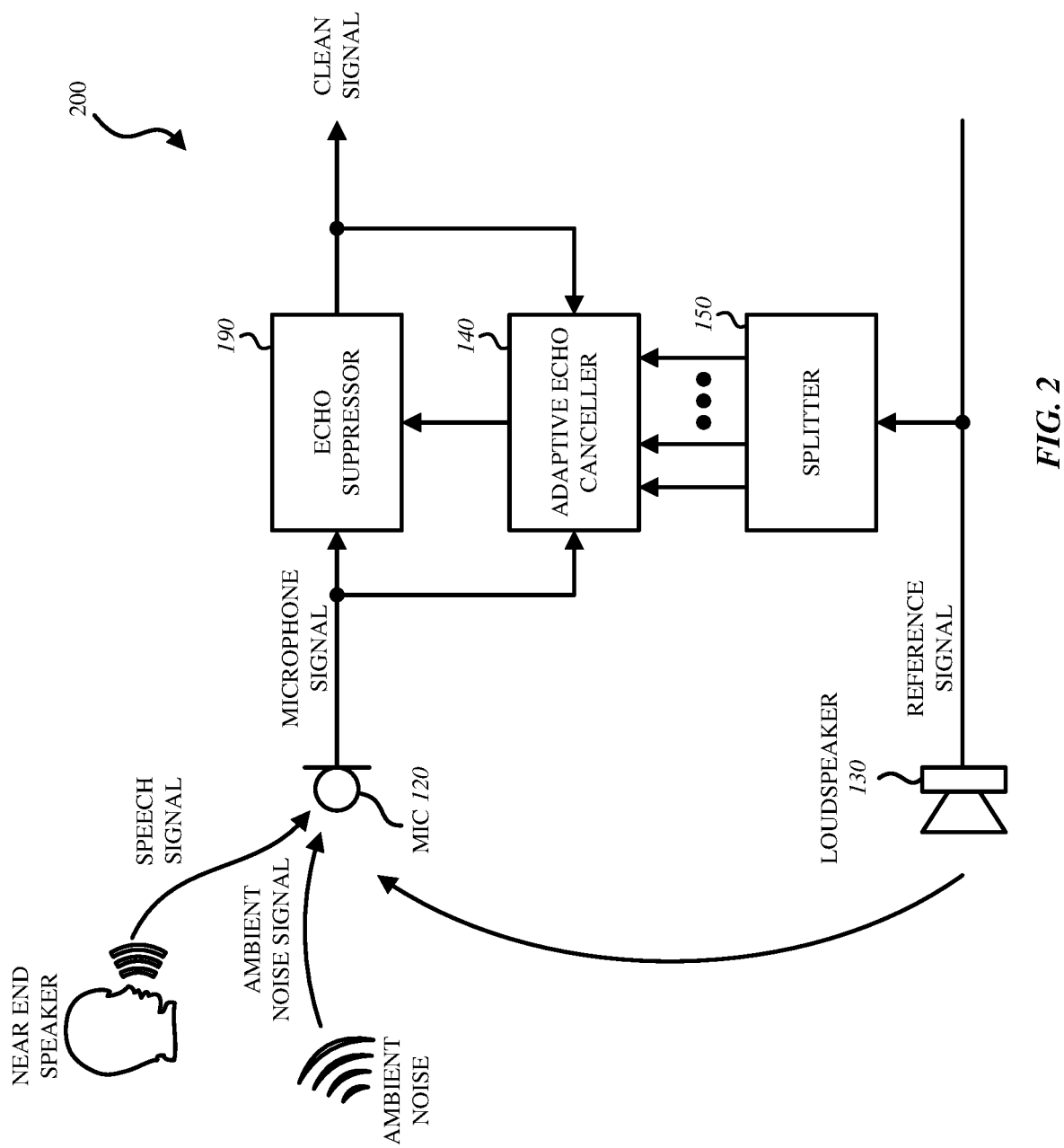
FIG. 2 illustrates a block diagram of a system for echo control using adaptive polynomial filters in sub-band domain according to one embodiment of the invention.

FIG. 2 illustrates a block diagram of a system 200 for echo control using adaptive polynomial filters in sub-band domain according to one embodiment of the invention. The system 200 includes microphone 120, a loudspeaker 130, a splitter 150, an echo suppressor 190, and an acoustic echo canceller (AEC) 140. While the system 200 in FIG. 2 includes only one microphone 120, it is understood that at least one of the microphones in the electronic device 10 may be included in the system 200. Accordingly, a plurality of microphones 120 may be included in the system 200. It is further understood that the at least one microphone 120 may be included in a headset used with the electronic device 10.

The microphone 120 may be an air interface sound pickup device that converts sound into an electrical signal. As the near-end user is using the electronic device 10 to transmit his speech, ambient noise may also be present. Thus, the microphone 120 captures the near-end user's speech as well as the ambient noise around the electronic device 10. A reference signal may be used to drive the loudspeaker 130 to generate a loudspeaker signal. The loudspeaker signal that is output from a loudspeaker 130 may also be a part of the environmental noise that is captured by the microphone, and if so, the loudspeaker signal that is output from the loudspeaker 130 could get fed back in the near-end device's microphone signal to the far-end device's downlink signal. This loudspeaker signal would in part drive the far-end device's loudspeaker, and thus, components of this loudspeaker signal would include near-end device's microphone signal to the far-end device's downlink signal as echo. Thus, the microphone 120 may receive at least one of: a near-end talker signal (e.g., a speech signal), an ambient near-end noise signal, or a loudspeaker signal. The microphone 120 generates and transmits a microphone signal (e.g., acoustic signal).

In one embodiment, system 200 further includes the echo suppressor 190 that receives the microphone signal from the microphone 120 and an echo estimate from the AEC 140, and suppresses the noise in the microphone signal based on the echo estimate to generate a clean signal. The noise in the microphone signal may include linear echo and non-linear echo (or residual echo). The noise suppressor may include an active subtraction stage followed by the application of a nonlinear gain function.

As shown in FIG. 2, the system 200 includes the AEC 140 that is a linear and non-linear echo canceller that generates an echo estimate. The AEC 140 receives the reference signal in a plurality of channels in a sub-band domain via a splitter 150 and the cleaned uplink signal (or clean signal) from the echo suppressor 190. Referring to FIG. 2, a splitter 150 receives the reference signal that drives the loudspeaker 130 as a single input channel and generates a plurality of output channels of the reference signal. In one embodiment, the splitter 150 may be a nonlinear single-input-multiple-out (SIMO) unit. The splitter 150 generates a plurality of outputs that are a representation of the reference signal. In this embodiment, the outputs from the splitter 150 which are a representation of the reference signal are not identical signals. Each of the outputs from the splitter 150 may originate from the same reference signal driving the loudspeaker 130. For example, the first output from the splitter 150 (e.g., channel one) may contain x(n) and the second output from the splitter 150 (e.g., channel two) contain x(n)*x(n) which is the square of the original reference signal driving the loudspeaker 130.

In another embodiment, the outputs from the splitter 150 include a representation of the 2nd-order Volterra series. For example, the first output from the splitter 150 (e.g., channel one) may contain x(n), the second output from the splitter 150 (e.g., channel two) may contain x(n)*x(n), the third output from the splitter 150 (e.g., channel three) may contain x(n)*x(n−1), the fourth output from the splitter 150 (e.g., channel four) may contain x(n)*x(n−2). This embodiment includes an adaptive Volterra filtering in the sub-band domain with memory (i.e., sub-band Volterra filter). The memory in this embodiment is incorporated in the system by considering interactions between reference signal samples with different time-delays.

In one embodiment, multiple loudspeakers are included in the system 200. In this embodiment, to enable nonlinear echo cancellation for a multichannel loudspeaker signal (e.g., multiple reference signals), the splitter 150 may be a non-linear multiple-input-multiple-output (MIMO) unit.

Figure 3:
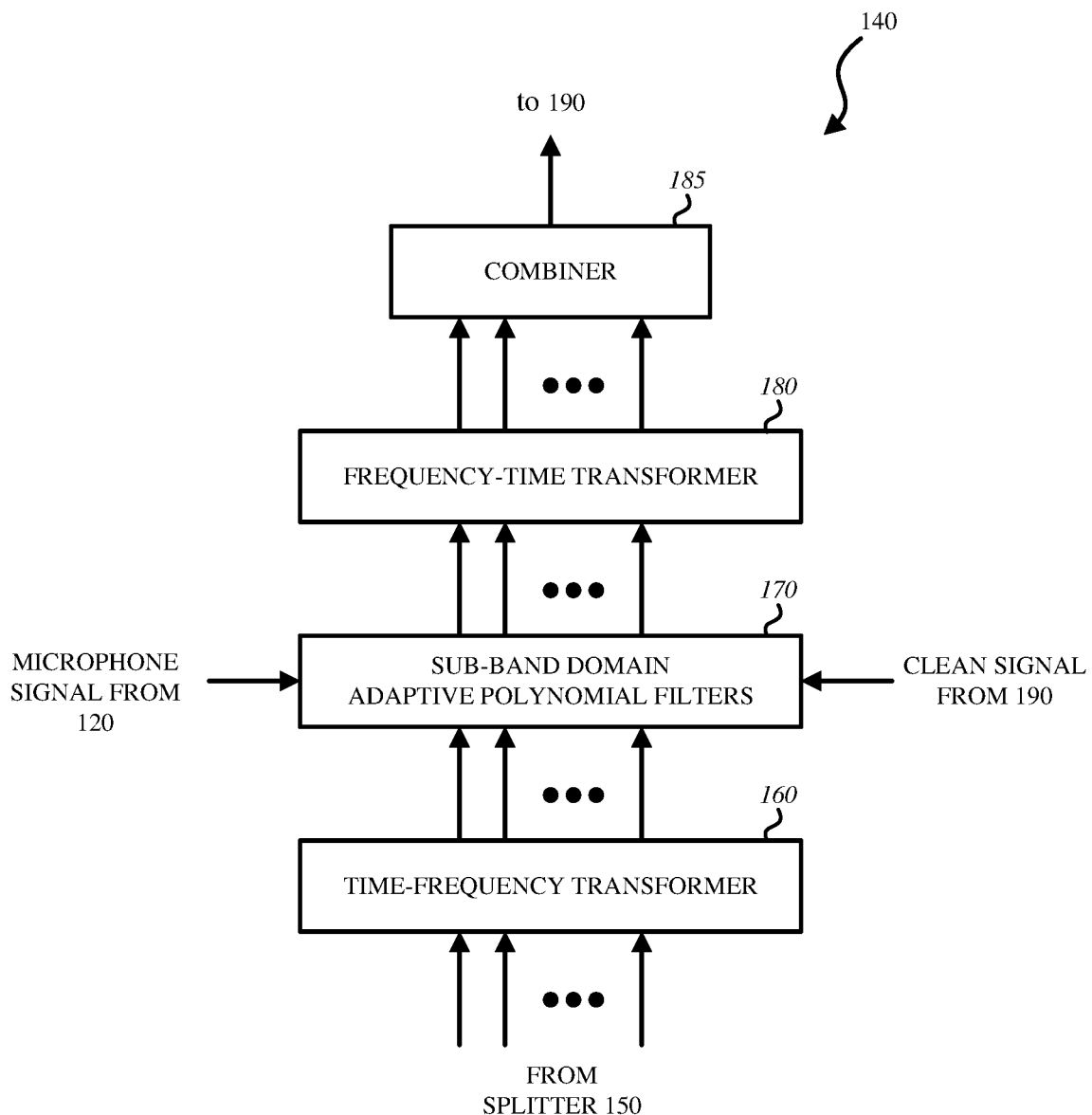
FIG. 3 illustrates a block diagram of the details of an adaptive echo canceller (AEC) of the system in FIG. 2 for echo control using adaptive polynomial filters in sub-band domain according to one embodiment of the invention.

The AEC 140 may include a plurality of adaptive polynomial filters that adaptively filter the reference signal in a plurality of channels in a sub-band domain based at least on the clean signal to generate the echo estimate. The adaptive echo canceller 140 also receives the noisy signal from microphone 120. FIG. 3 illustrates a block diagram of the details of the AEC 140 of the system 200 according to one embodiment of the invention. As shown in FIG. 3, the AEC 140 includes a time-frequency transformer 160, sub-band domain adaptive polynomial filters 170, a frequency-time transformer 180, and a combiner 185.

The time-frequency transformer 160 first receives the reference signal in a plurality of channels in a sub-band domain via a splitter 150. In one embodiment, the multiple channels are created to monitor the non-linear components of the reference signal. Accordingly, the multiple channels may be a pseudo-multichannel since the same reference signal is being used to generate the nonlinear representations in each of the plurality of channels. The time-frequency transformer 160 transforms the reference signal in the plurality of channels from a time domain to windowed sub-band domain. In one embodiment, the time-frequency transformer 160 performs windowed Short-Time Fourier Transform (STFT) on the reference signal in a plurality of channels in the time domain to obtain the frequency domain. In one embodiment, the time-frequency transformer 160 includes polyphase filterbanks with or without time-aliasing.

In some embodiments, to get the pseudo-multichannel model, other options may be used such as, cascade modeling, different basis functions, different model orders, etc.

The sub-band domain adaptive polynomial filters 170 are a plurality of adaptive polynomial filters that adaptively filter the reference signal in a plurality of channels in a sub-band domain based on the clean signal from the echo suppressor 190 and the microphone signal from 120 to generate the echo estimate. The processing domain in some embodiments of the invention is the sub-band domain. The sub-band domain adaptive polynomial filters 170 may converge to generate the echo estimate of the echo in the microphone signal. The sub-band domain adaptive polynomial filters 170 receive and process the reference signal in a plurality of channels in the sub-band domain, and the sub-band domain adaptive polynomial filters 170 generate an echo estimate in the plurality of channels in the sub-band domain. In one embodiment, the sub-band domain adaptive polynomial filters 170 determine parameters of a polynomial model jointly with a linear echo control path using gradient based adaptation. In this embodiment, the sub-band domain adaptive polynomial filters 170 generate the echo estimate that encompasses linear and non-linear echo estimates.

The windowed frequency-time transformer 180 receives the echo estimate in the plurality of channels in the frequency domain from the sub-band domain adaptive polynomial filters 170 and transforms the echo estimate in the plurality of channels in the windowed frequency domain to an echo estimate in the plurality of channels in the time domain. In one embodiment, the windowed frequency-time transformer 180 performs an inverse transformation to generate the echo estimate in the plurality of channels in the time domain. In one embodiment, the windowed frequency-time transformer 180 performs an Inverse Short-Time Fourier Transform (STFT) on the echo estimate in the plurality of channels in the windowed frequency domain to an echo estimate in the plurality of channels in the time domain.

The combiner 185 generates the echo estimate by combining the echo estimate in the plurality of channels in the time domain received from the windowed frequency-time transformer 180. The combiner 185 transmits the echo estimate to the echo suppressor 190.

In one embodiment, the combiner 185 may receive and combine the echo estimate in the plurality of channels in the windowed frequency domain from the sub-band domain adaptive polynomial filters 170 to generate an echo estimate in the windowed frequency domain. The windowed frequency-time transformer 180 then transforms the echo estimate in the windowed frequency domain from the combiner 185 to an echo estimate in the time domain.

Figure 4:
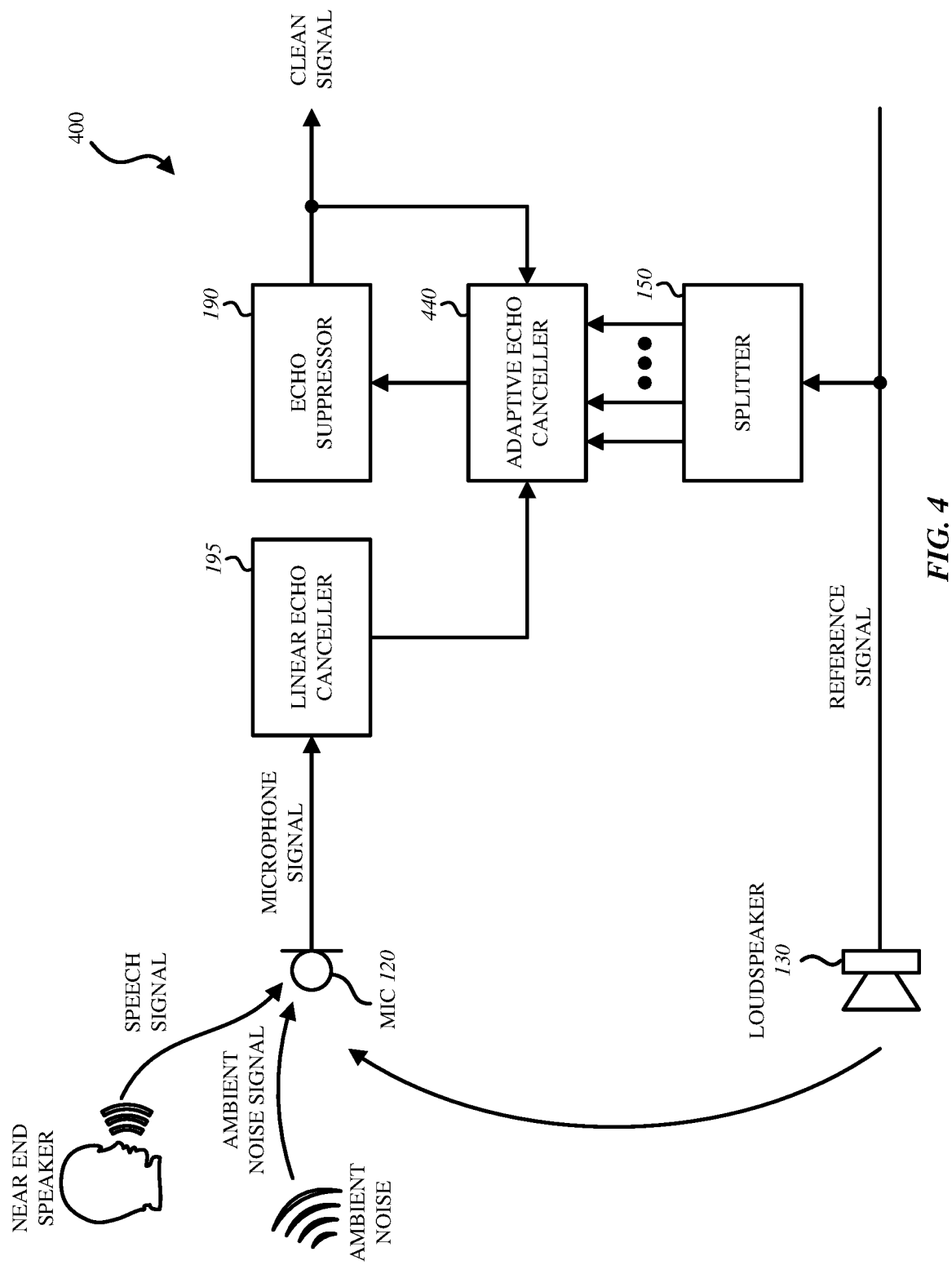
FIG. 4 illustrates a block diagram of a system for echo control using adaptive polynomial filters in sub-band domain according to one embodiment of the invention.

FIG. 4 illustrates a block diagram of a system 400 for echo control using adaptive polynomial filters in sub-band domain according to one embodiment of the invention. The system 400 includes a microphone 120, a loudspeaker 130, a splitter 150, a linear echo canceller (EC) 195, an echo suppressor 190, and an acoustic echo canceller (AEC) 440. While the system 400 in FIG. 4 includes only one microphone 120, it is understood that at least one of the microphones in the electronic device 10 may be included in the system 200. Accordingly, a plurality of microphones 120 may be included in the system 200. It is further understood that the at least one microphone 120 may be included in a headset used with the electronic device 10.

In this embodiment, the microphone signal from the microphone 120 is received by the linear EC 195. The linear EC 195 may an adaptive linear filter or a fixed linear filter. The linear EC 195 linearly estimates echo to generate a linear echo estimate. In some embodiments, the linear EC 195 cancels the linear echo from a microphone signal using the linear echo estimate, and generates a linear EC corrected microphone signal.

As shown in FIG. 4, the AEC 440 receives the linear EC corrected microphone signal from the linear EC 195, the reference signal in a plurality of channels in a sub-band domain via the splitter 150 and the clean signal from the echo suppressor 190 and generates an AEC output signal. Referring to FIG. 4, a splitter 150 receives the reference signal that drives the loudspeaker 130 as a single input channel and generates a plurality of output channels of the reference signal. In one embodiment, the splitter 150 may be a nonlinear single-input-multiple-out (SIMO) unit. The splitter 150 generates a plurality of outputs that are a representation of the reference signal. In this embodiment, the outputs from the splitter 150 which are a representation of the reference signal are not identical signals. Each of the outputs from the splitter 150 may originate from the same reference signal driving the loudspeaker 130. For example, the first output from the splitter 150 (e.g., channel one) may contain $x(n)$ and the second output from the splitter 150 (e.g., channel two) may contain $x(n)*x(n)$ which is the square of the original reference signal driving the loudspeaker 130.

In another embodiment, the outputs from the splitter 150 include a representation of the 2nd-order Volterra series. For example, the first output from the splitter 150 (e.g., channel one) may contain $x(n)$, the second output from the splitter 150 (e.g., channel two) may contain $x(n)*x(n)$, the third output from the splitter 150 (e.g., channel three) may contain $x(n)*x(n-1)$, the fourth output from the splitter 150 (e.g., channel four) may contain $x(n)*x(n-2)$. This embodiment includes an adaptive Volterra filtering in the sub-band domain with memory (i.e., sub-band Volterra filter). The memory in this embodiment is incorporated in the system by considering interactions between reference signal samples with different time-delays.

In one embodiment, multiple loudspeakers are included in the system 400. In this embodiment, to enable nonlinear echo cancellation, the splitter 150 may be a non-linear multiple-input-multiple-output (MIMO) unit.

Figure 5:
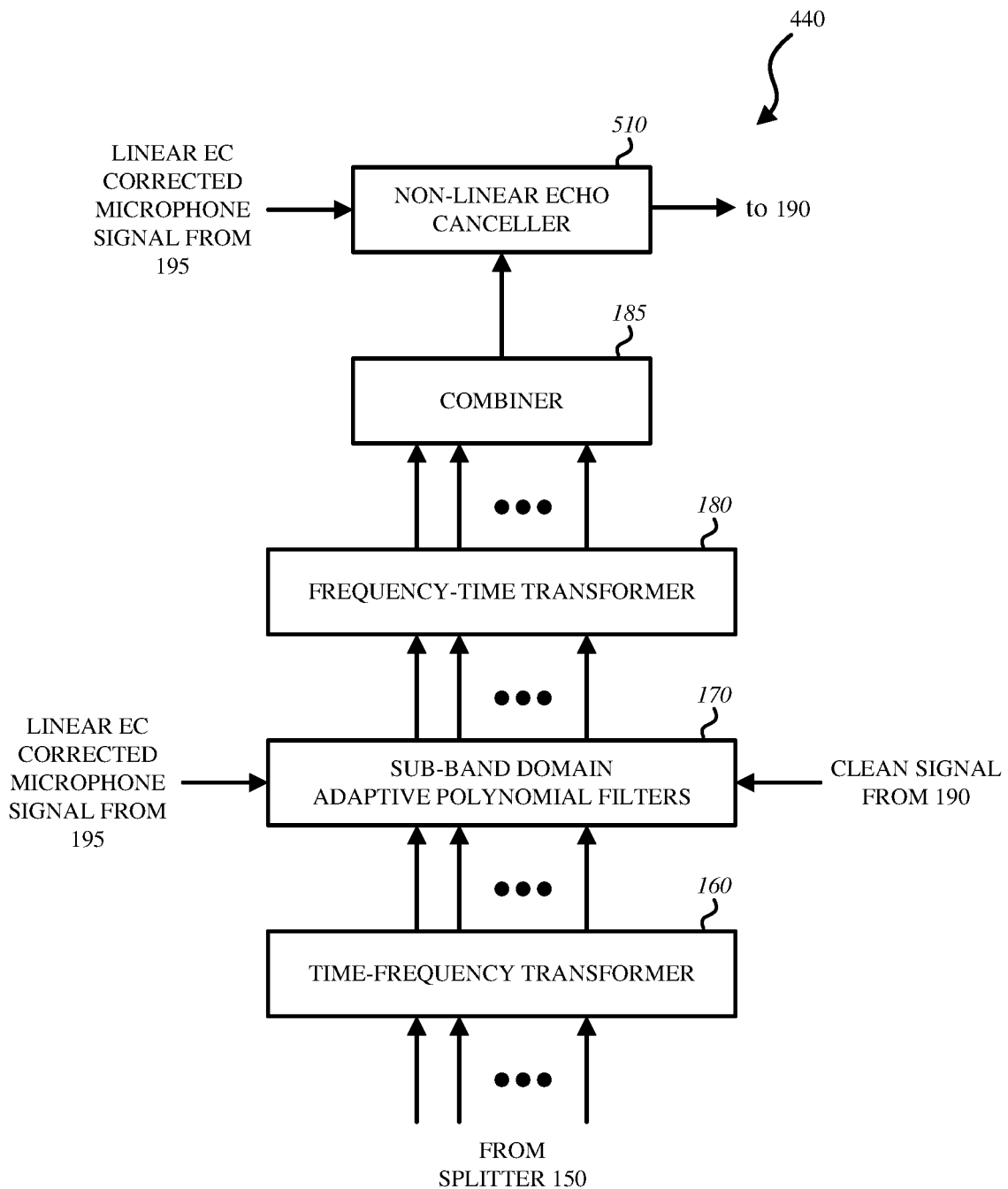
FIG. 5 illustrates a block diagram of the details of an adaptive echo canceller (AEC) of the system in FIG. 4 for echo control using adaptive polynomial filters in sub-band domain according to one embodiment of the invention.

FIG. 5 illustrates a block diagram of the details of an adaptive echo canceller (AEC) of the system in FIG. 4 for echo control using adaptive polynomial filters in sub-band domain according to one embodiment of the invention. As shown in FIG. 5, the AEC 140 includes a windowed time-frequency transformer 160, sub-band domain adaptive polynomial filters 170, a windowed frequency-time transformer 180, a combiner 185, and a non-linear echo canceller (EC) 510.

The windowed time-frequency transformer 160 receives the reference signal in a plurality of channels in a sub-band domain via the splitter 150. The windowed time-frequency transformer 160 transforms the reference signal in the plurality of channels from a time domain to a windowed frequency domain. In one embodiment, the windowed time-frequency transformer 160 performs a Short-Time Fourier Transform (STFT) on the reference signal in a plurality of channels in the time domain to obtain the windowed frequency domain signals. In one embodiment, the windowed time-frequency transformer 160 includes polyphase filterbanks with or without time aliasing.

The sub-band domain adaptive polynomial filters 170 are a plurality of adaptive polynomial filters that adaptively filter the reference signal in a plurality of channels in a sub-band domain based on the clean signal from the echo suppressor 190 and the linear EC corrected microphone signal from the linear EC 195 to generate the echo estimate. The sub-band domain adaptive polynomial filters 170 may converge to generate the echo estimate of the echo in the microphone signal. The sub-band domain adaptive polynomial filters 170 receive and process the reference signal in a plurality of channels in the windowed frequency domain, and the sub-band domain adaptive polynomial filters 170 generate an echo estimate in the plurality of channels in the windowed frequency domain. In one embodiment, the sub-band domain adaptive polynomial filters 170 generate the echo estimate that estimates non-linear echo in the microphone signal.

The windowed frequency-time transformer 180 transforms the echo estimate in the plurality of channels in the windowed frequency domain to an echo estimate in the plurality of channels in the time domain. In one embodiment, the windowed frequency-time transformer 180 performs an inverse transformation to generate the echo estimate in the plurality of channels in the time domain. In one embodiment, the frequency-time transformer 180 performs an Inverse Short-Time Fourier Transform (STFT) on the echo estimate in the plurality of channels in the windowed frequency domain to an echo estimate in the plurality of channels in the time domain.

The combiner 185 generates the echo estimate by combining the echo estimate in the plurality of channels in the time domain received from the frequency-time transformer 180. As shown in FIG. 5, the combiner 185 transmits the echo estimate to the non-linear EC 510. The non-linear EC 510 removes the echo estimate from the linear EC corrected microphone signal received from the linear EC 195 to generate the AEC output signal. In one embodiment, this subtractive stage can be part of the echo suppressor 190.

In one embodiment, the combiner 185 may receive and combine the echo estimate in the plurality of channels in the windowed frequency domain from the sub-band domain adaptive polynomial filters 170 to generate an echo estimate in the windowed frequency domain. The windowed frequency-time transformer 180 then transforms the echo estimate in the windowed frequency domain from the combiner 185 to an echo estimate in the time domain.

Referring back to FIG. 4, in one embodiment, the echo suppressor 190 receives the AEC output signal from the AEC 140 and removes a residual echo from the AEC output signal to generate the clean signal. The echo suppressor 190 in system 400 may be a residual echo suppressor (ES) that filters the AEC output signal to remove any un-cancelled or unsuppressed echo. This suppressor can be a combination of a subtractive stage followed by a nonlinear gain function.

Figure 6:
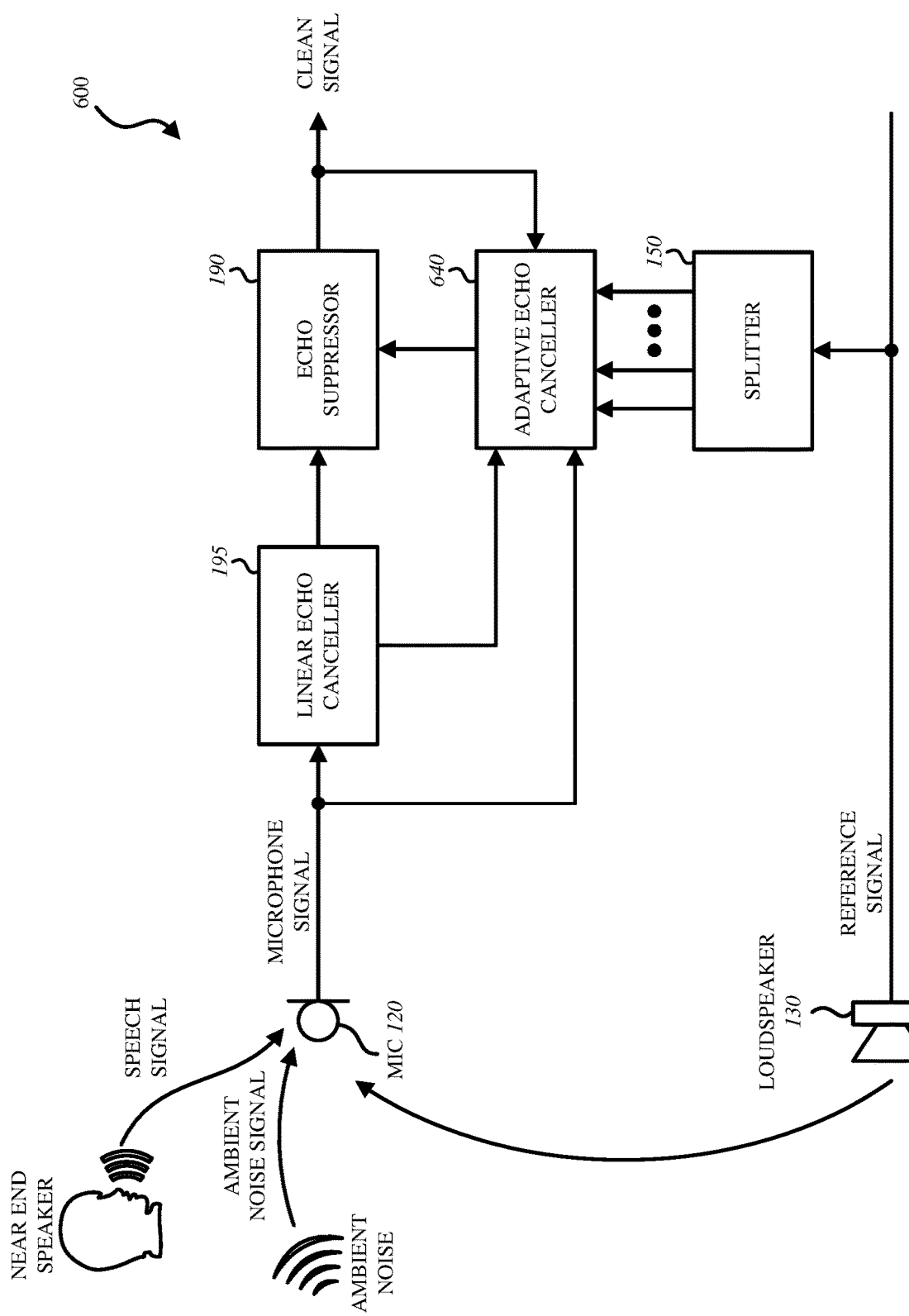
FIG. 6 illustrates a block diagram of a system for echo control using adaptive polynomial filters in sub-band domain according to one embodiment of the invention.

FIG. 6 illustrates a block diagram of a system 600 for echo control using adaptive polynomial filters in sub-band domain according to one embodiment of the invention. Similar to FIG. 4, the system 600 of FIG. 6 includes a microphone 120, a loudspeaker 130, a splitter 150, a linear echo canceller (EC) 195, an echo suppressor 190, and an acoustic echo canceller (AEC) 640. While the system 600 in FIG. 6 includes only one microphone 120, it is understood that at least one of the microphones in the electronic device 10 may be included in the system 200. Accordingly, a plurality of microphones 120 may be included in the system 200. It is further understood that the at least one microphone 120 may be included in a headset used with the electronic device 10.

In this embodiment, the microphone signal from the microphone 120 is received by the linear EC 195 and the AEC 640. The linear EC 195 may be an adaptive linear filter or a fixed linear filter. The linear EC 195 linearly estimates echo to generate a linear echo estimate. In some embodiments, the linear EC 195 cancels the linear echo from a microphone signal using the linear echo estimate, and generates a linear EC corrected microphone signal that is transmitted to the echo suppressor 190 and the AEC 640.

As shown in FIG. 6, the AEC 640 receives the linear EC corrected microphone signal from the linear EC 195, the microphone signal from the microphone 120, the reference signal in a plurality of channels in the sub-band domain via the splitter 150, and the clean signal from the echo suppressor 190. Referring to FIG. 6, a splitter 150 receives the reference signal that drives the loudspeaker 130 as a single input channel and generates a plurality of output channels of the reference signal. In one embodiment, the splitter 150 may be a nonlinear single-input-multiple-out (SIMO) unit. The splitter 150 generates a plurality of outputs that are a representation of the reference signal. In this embodiment, the outputs from the splitter 150 which are a representation of the reference signal are not identical signals. Each of the outputs from the splitter 150 may originate from the same reference signal driving the loudspeaker 130. For example, the first output from the splitter 150 (e.g., channel one) may contain x(n) and the second output from the splitter 150 (e.g., channel two) may contain x(n)*x(n) which is the square of the original reference signal driving the loudspeaker 130.

In another embodiment, the outputs from the splitter 150 include a representation of the 2nd-order Volterra series. For example, the first output from the splitter 150 (e.g., channel one) may contain x(n), the second output from the splitter 150 (e.g., channel two) may contain x(n)*x(n), the third output from the splitter 150 (e.g., channel three) may contain x(n)*x(n−1), the fourth output from the splitter 150 (e.g., channel four) may contain x(n)*x(n−2). This embodiment includes an adaptive Volterra filtering in the sub-band domain with memory (i.e., sub-band Volterra filter). The memory in this embodiment is incorporated in the system by considering interactions between reference signal samples with different time-delays.

In one embodiment, multiple loudspeakers are included in the system 400. In this embodiment, to enable nonlinear echo cancellation, the splitter 150 may be a non-linear multiple-input-multiple-output (MIMO) unit.

Figure 7:
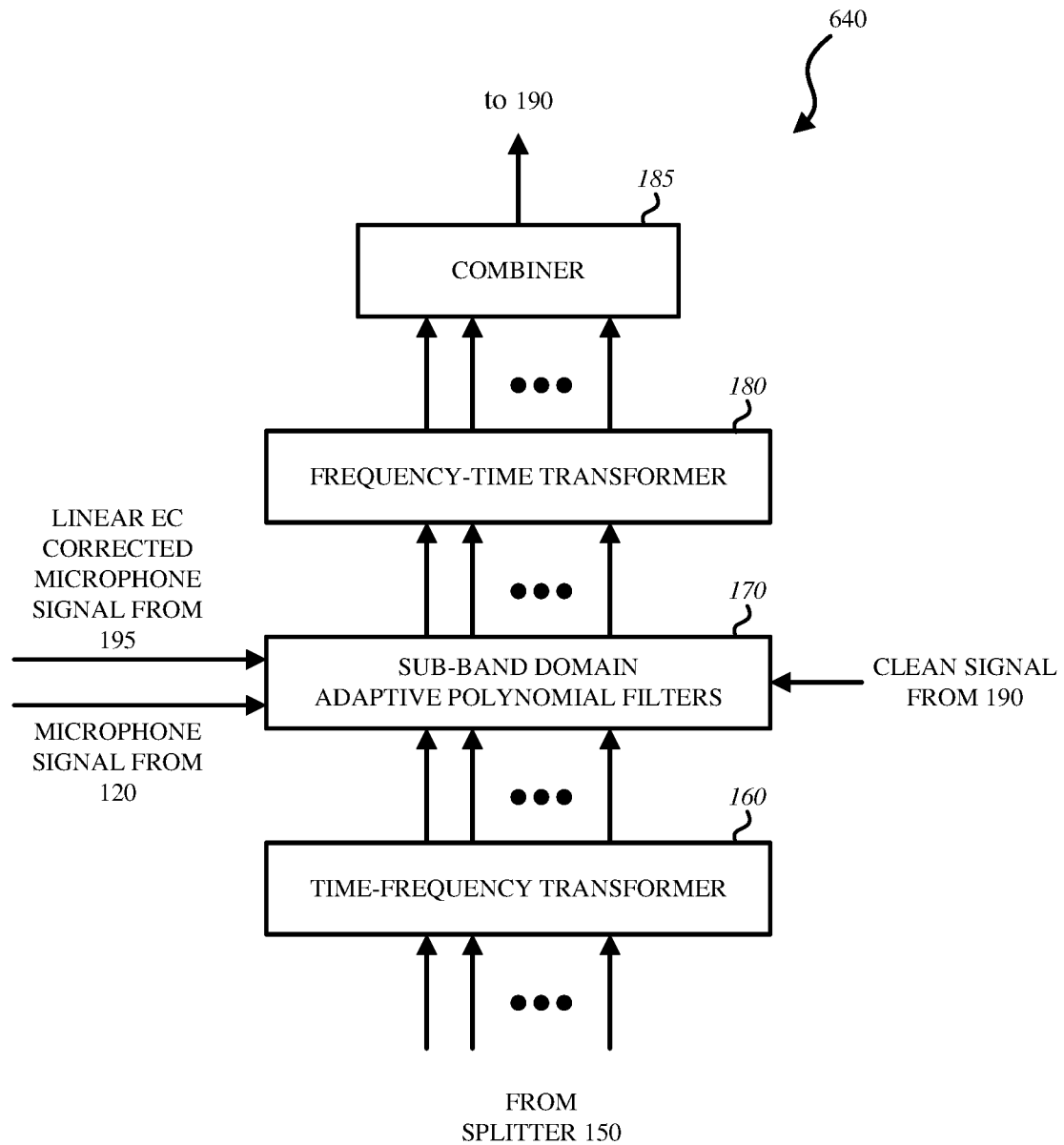
FIG. 7 illustrates a block diagram of the details of an adaptive echo canceller (AEC) of the system in FIG. 6 for echo control using adaptive polynomial filters in sub-band domain according to one embodiment of the invention.

The AEC 640 generates an AEC output signal that is transmitted to the echo suppressor 190. FIG. 7 illustrates a block diagram of the details of the AEC 640 according to one embodiment of the invention. As shown in FIG. 7, the AEC 640 includes a windowed time-frequency transformer 160, sub-band domain adaptive polynomial filters 170, a windowed frequency-time transformer 180, and a combiner 185.

The windowed time-frequency transformer 160 transforms the representation of the reference signal in the plurality of channels from a time domain to a windowed frequency domain. In one embodiment, the time-frequency transformer 160 performs a Short-Time Fourier Transform (STFT) on the representation of the reference signal in a plurality of channels in the time domain to obtain the frequency domain. In one embodiment, the time-frequency transformer 160 includes polyphase filterbanks.

The sub-band domain adaptive polynomial filters 170 are a plurality of adaptive polynomial filters that adaptively filter representations of the reference signal in a plurality of channels in a sub-band domain based on the clean signal from the echo suppressor 190 to generate an estimate of a residual echo power. The estimate of the residual echo power may estimate power of the residual echo in the microphone signal. In one embodiment, the sub-band domain adaptive polynomial filters 170 generates the estimate of the residual echo power based on at least one of: the linear EC corrected microphone signal from the linear EC 195, the microphone signal from the microphone 120, the representation of the reference signal in a plurality of channels in a windowed frequency domain from the windowed time-frequency transformer 160, or the clean signal from the echo suppressor 190.

The sub-band domain adaptive polynomial filters 170 may converge to generate the estimate of a residual echo power in the microphone signal. The sub-band domain adaptive polynomial filters 170 receive and process the representation of the reference signal in a plurality of channels in the windowed frequency domain, and the sub-band domain adaptive polynomial filters 170 generate the estimate of residual echo power in the plurality of channels in the windowed frequency domain.

The windowed frequency-time transformer 180 transforms the estimate of residual echo power in the plurality of channels in the windowed frequency domain to an estimate of residual echo power in the plurality of channels in the time domain. In one embodiment, the windowed frequency-time transformer 180 performs an inverse transformation to generate the estimate of residual echo power in the plurality of channels in the time domain. In one embodiment, the windowed frequency-time transformer 180 performs an Inverse Short-Time Fourier Transform (STFT) on the estimate of residual echo power in the plurality of channels in the windowed frequency domain to an estimate of residual echo power in the plurality of channels in the time domain.

The combiner 185 generates the estimate of residual echo power by combining the estimate of residual echo power in the plurality of channels in the time domain received from the windowed frequency-time transformer 180. Referring back to FIG. 6, in one embodiment, the echo suppressor 190 receives the estimate of the residual echo power from the AEC 140 and suppresses or removes residual echo from the linear EC corrected microphone signal based on the estimate of the residual echo power to generate the clean signal. The echo suppressor 190 in system 600 may be a residual echo suppressor (ES) that filters the AEC output signal to remove any un-cancelled or unsuppressed echo. The echo suppressor 190 can be a combination of a subtractive stage followed by the application of a nonlinear gain function.

In one embodiment, the combiner 185 may receive and combine the estimate of residual echo power in the plurality of channels in the windowed frequency domain from the sub-band domain adaptive polynomial filters 170 to generate an estimate of the residual echo power in the windowed frequency domain. The windowed frequency-time transformer 180 then transforms the estimate of the residual echo power in the windowed frequency domain from the combiner 185 to an estimate of residual echo power in the time domain.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 8:
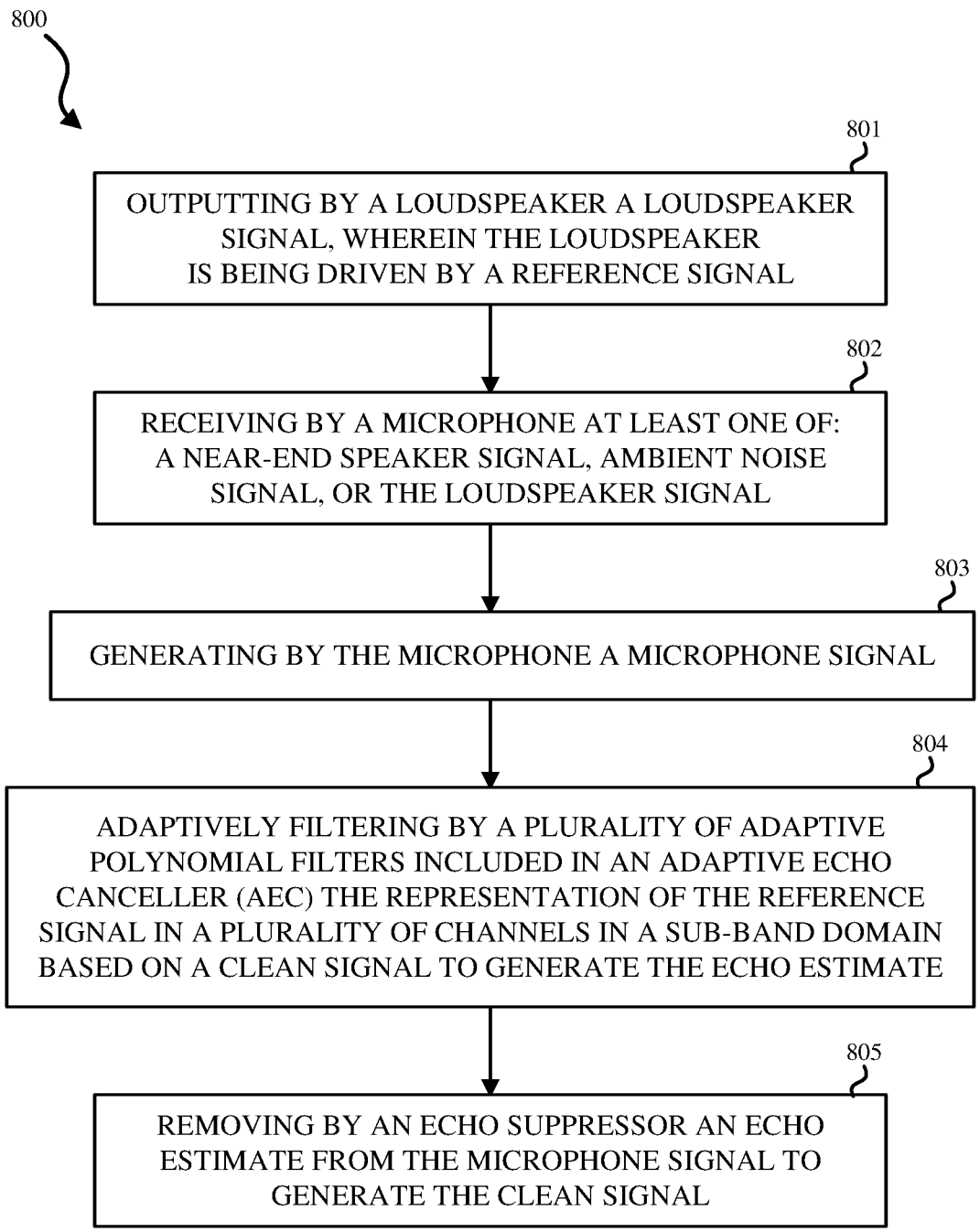
FIG. 8 illustrates a flow diagram of an example method for echo control using adaptive polynomial filters in sub-band domain according to one embodiment of the invention.

FIG. 8 illustrates a flow diagram of an example method 800 for echo control using adaptive polynomial filters in sub-band domain according to one embodiment of the invention. Method 800 starts with a loudspeaker that is being driven by a reference signal outputting a loudspeaker signal at Block 801. At Block 802, a microphone receives at least one of: a near-end speaker signal, ambient noise signal, or the loudspeaker signal and at Block 803, the microphone generates a microphone signal. At Block 804, a plurality of adaptive polynomial filters included in an adaptive echo canceller (AEC) adaptively filter the representation of the reference signal in a plurality of channels in a sub-band domain based on a clean signal to generate the echo estimate. In one embodiment, the adaptive polynomial filters determine parameters of a polynomial model jointly with a linear echo control path using gradient based adaptation and thus, the adaptive polynomial filters generate the echo estimate that estimates linear and non-linear echo.

In one embodiments, a windowed time-frequency transformer included in the AEC receives the reference signal in the plurality of channels, transforms the reference signal in the plurality of channels from a time domain to a windowed frequency domain. In this embodiment, the adaptive polynomial filters receive and process the representation of the reference signal in a plurality of channels in the windowed frequency domain and generate an echo estimate in the plurality of channels in the windowed frequency domain. In one embodiment, a windowed frequency-time transformer included in the AEC then transforms the echo estimate in the plurality of channels in the windowed frequency domain to an echo estimate in the plurality of channels in the time domain. In one embodiment, a combiner included in the AEC generates the echo estimate by combining the echo estimate in the plurality of channels in the time domain, and transmits the echo estimate to an echo suppressor. At Block 805, the echo suppressor removes an echo estimate from the microphone signal to generate the clean signal.

In one embodiment, the combiner may first combine the echo estimate in the plurality of channels in the windowed frequency domain to generate an echo estimate in the windowed frequency domain. The windowed frequency-time transformer then transforms the echo estimate in the windowed frequency domain from the combiner to an echo estimate in the time domain.

Figure 9:
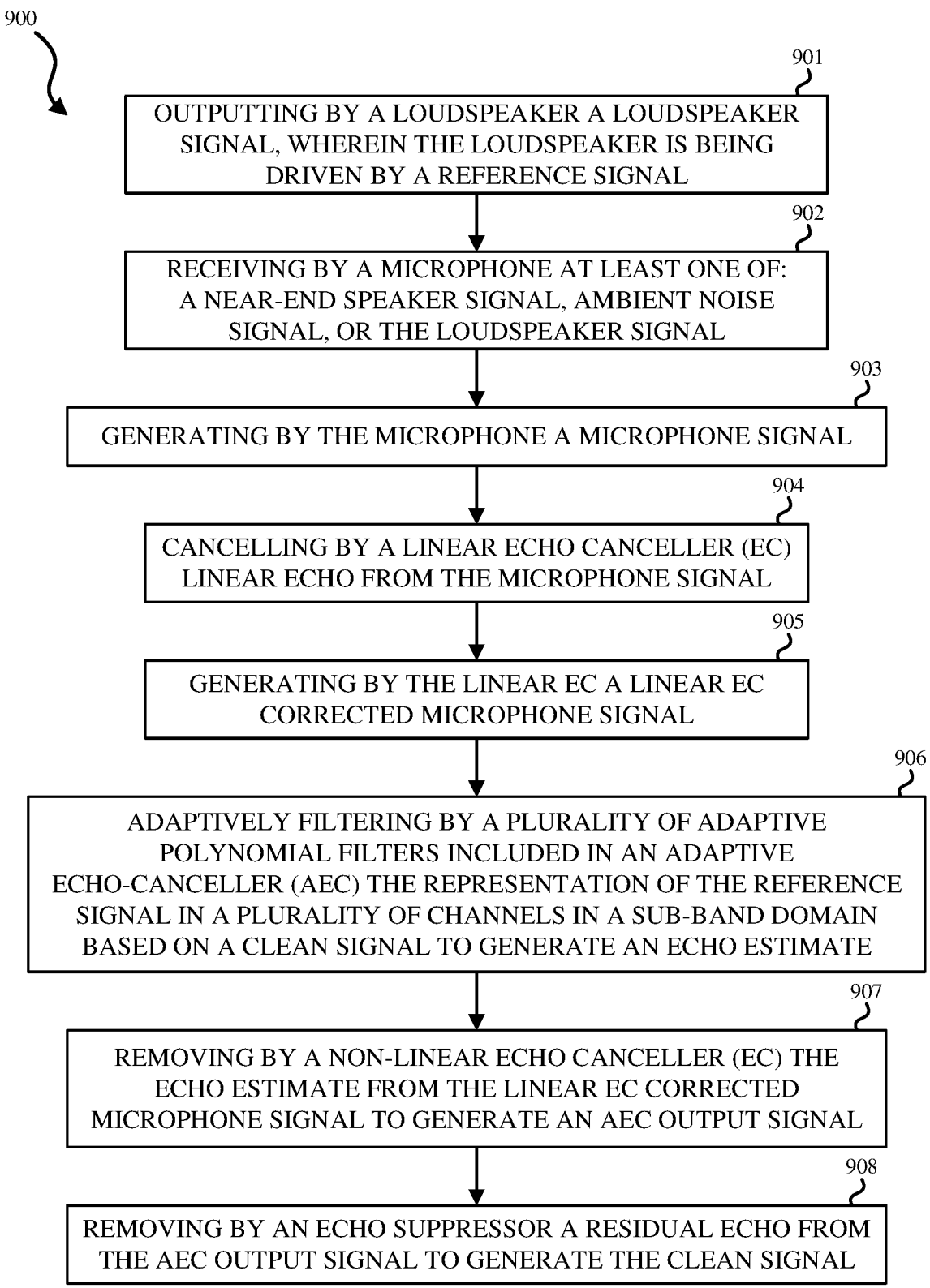
FIG. 9 illustrates a flow diagram of an example method for echo control using adaptive polynomial filters in sub-band domain according to one embodiment of the invention.

FIG. 9 illustrates a flow diagram of an example method 900 for echo control using adaptive polynomial filters in sub-band domain according to one embodiment of the invention. Method 900 starts at Block 901 with a loudspeaker that is being driven by a reference signal outputting a loudspeaker signal. At Block 902, a microphone receives at least one of: a near-end speaker signal, ambient noise signal, or the loudspeaker signal and at Block 903, the microphone generates a microphone signal. At Block 904, a linear echo canceller (EC) cancels linear echo from the microphone signal and at Block 905, the linear EC generates a linear EC corrected microphone signal. At Block 906, a plurality of adaptive polynomial filters included in an adaptive echo-canceller (AEC) adaptively filter the representation of the reference signal in a plurality of channels in a sub-band domain based on a clean signal to generate an echo estimate. At Block 907, a non-linear echo canceller (EC) removes the echo estimate from the linear EC corrected microphone signal to generate an AEC output signal. At Block 908, an echo suppressor removes a residual echo from the AEC output signal to generate the clean signal.

Figure 10:
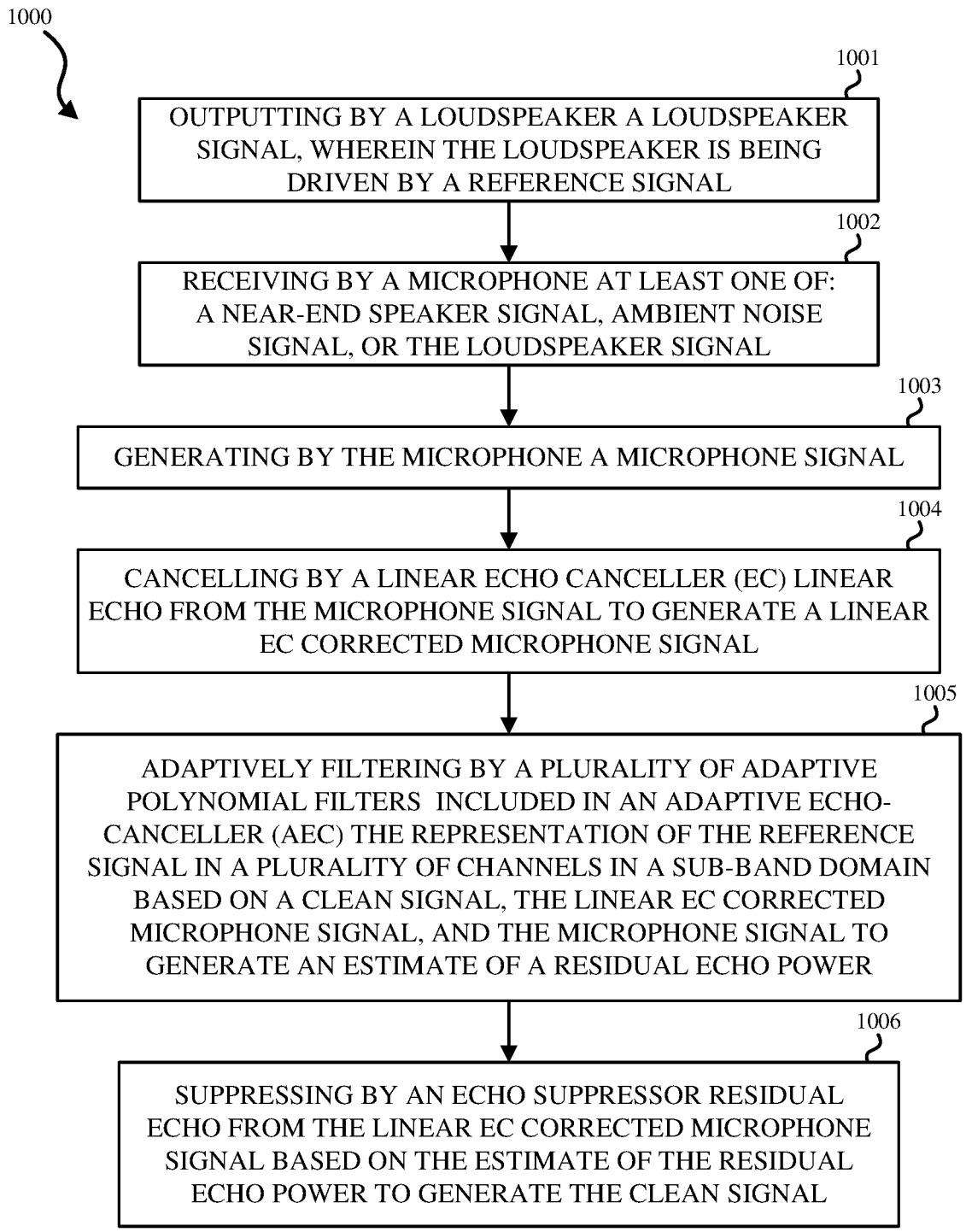
FIG. 10 illustrates a flow diagram of an example method for echo control using adaptive polynomial filters in sub-band domain according to one embodiment of the invention.

FIG. 10 illustrates a flow diagram of an example method 1000 for echo control using adaptive polynomial filters in sub-band domain according to one embodiment of the invention. Method 1000 starts at Block 1001 with a loudspeaker that is being driven by a reference signal outputting a loudspeaker signal. At Block 1002, a microphone receives at least one of: a near-end speaker signal, ambient noise signal, or the loudspeaker signal and at Block 1003, the microphone generates a microphone signal. At Block 1004, a linear echo canceller (EC) cancels the linear echo from the microphone signal to generate a linear EC corrected microphone signal. At Block 1005, a plurality of adaptive polynomial filters included in an adaptive echo-canceller (AEC) adaptively filter the representation of the reference signal in a plurality of channels in a sub-band domain based on a clean signal, the linear EC corrected microphone signal, and the microphone signal to generate an estimate of a residual echo power. At Block 1006, an echo suppressor suppresses residual echo from the linear EC corrected microphone signal based on the estimate of the residual echo power to generate the clean signal.

Figure 11:
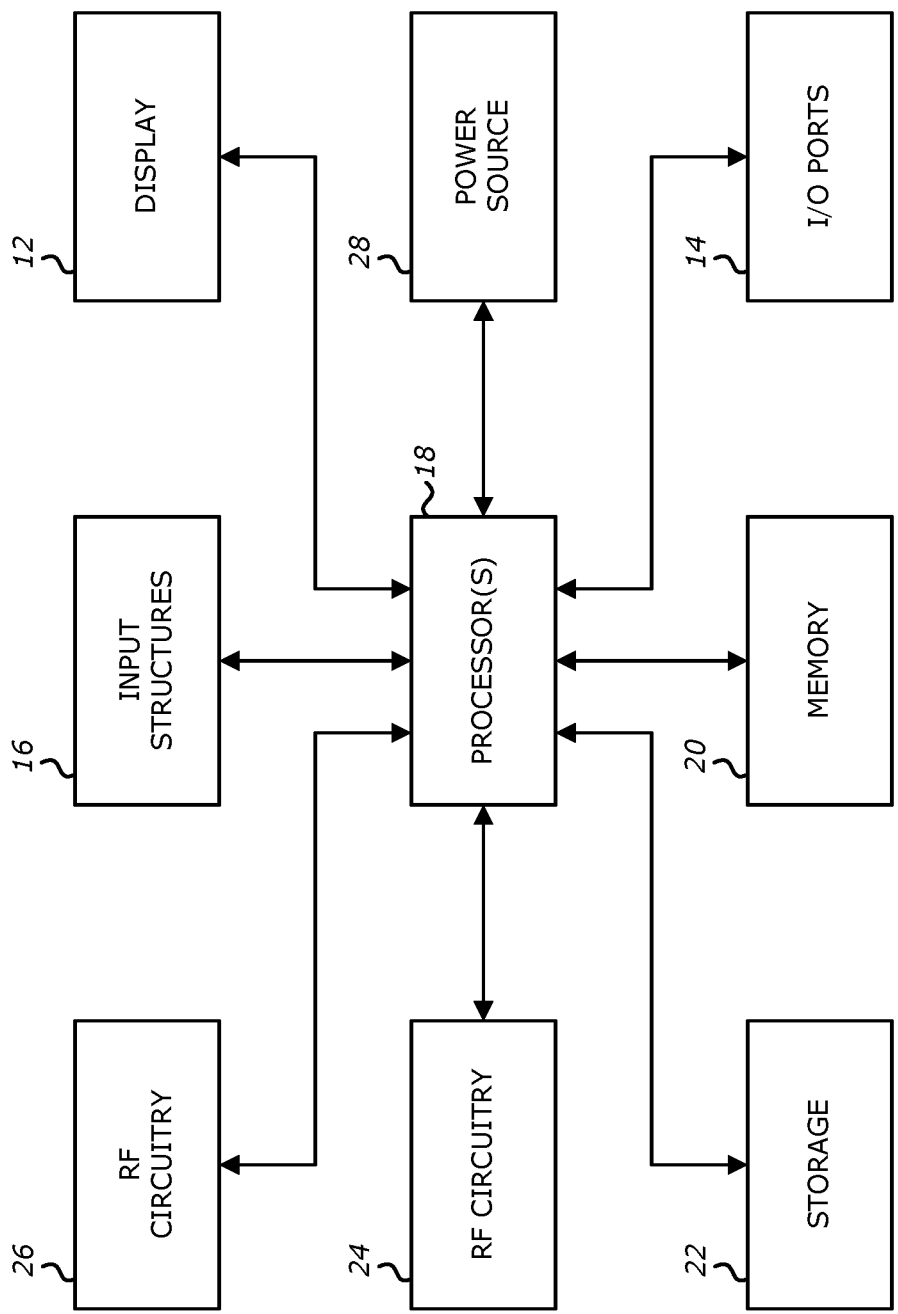
FIG. 11 is a block diagram of exemplary components of an electronic device for echo control using adaptive polynomial filters in sub-band domain in accordance with aspects of the present disclosure.

A general description of suitable electronic devices for performing these functions is provided below with respect to FIG. 11. Specifically, FIG. 11 is a block diagram depicting various components that may be present in electronic devices suitable for use with the present techniques. The electronic device may be in the form of a computer, a handheld portable electronic device, and/or a computing device having a tablet-style form factor. These types of electronic devices, as well as other electronic devices providing comparable speech recognition capabilities may be used in conjunction with the present techniques.

Keeping the above points in mind, FIG. 11 is a block diagram illustrating components that may be present in one such electronic device 10, and which may allow the device 10 to function in accordance with the techniques discussed herein. The various functional blocks shown in FIG. 11 may include hardware elements (including circuitry), software elements (including computer code stored on a computer-readable medium, such as a hard drive or system memory), or a combination of both hardware and software elements. It should be noted that FIG. 11 is merely one example of a particular implementation and is merely intended to illustrate the types of components that may be present in the electronic device 10. For example, in the illustrated embodiment, these components may include a display 16, input/output (I/O) ports 14, input structures 12, one or more processors 18, memory device(s) 20, non-volatile storage 22, expansion card(s) 24, RF circuitry 26, and power source 28.

In the embodiment of the electronic device 10 in the form of a computer, the embodiment includes computers that are generally portable (such as laptop, notebook, tablet, and handheld computers), as well as computers that are generally used in one place (such as conventional desktop computers, workstations, and servers).

The electronic device 10 may also take the form of other types of devices, such as mobile telephones, media players, personal data organizers, handheld game platforms, cameras, and/or combinations of such devices. For instance, the device 10 may be provided in the form of a handheld electronic device that includes various functionalities (such as the ability to take pictures, make telephone calls, access the Internet, communicate via email, record audio and/or video, listen to music, play games, connect to wireless networks, and so forth).

In another embodiment, the electronic device 10 may also be provided in the form of a portable multi-function tablet computing device. In certain embodiments, the tablet computing device may provide the functionality of media player, a web browser, a cellular phone, a gaming platform, a personal data organizer, and so forth.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components. In one embodiment, the machine-readable medium includes instructions stored thereon, which when executed by a processor, causes the processor to perform the method on an electronic device 10 as described above.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system for echo control using adaptive polynomial filters in sub-band domain comprising:
a loudspeaker to output a loudspeaker signal, wherein the loudspeaker is configured to be driven by a reference signal;
a microphone to receive at least one of: a near-end speaker signal, ambient noise signal, or the loudspeaker signal, and to generate a microphone signal;
a linear echo canceller (EC) to cancel linear echo from the microphone signal to generate a linear EC corrected microphone signal; and
an adaptive echo-canceller (AEC) including
a splitter to create a plurality of channels from the reference signal wherein each of the plurality of channels contains a nonlinear representation of the reference signal;
a time to frequency transformer to create a sub-band domain representation of the plurality of channels wherein the time-frequency transformer comprises a windowed time-frequency transformer to transform the plurality of channels from a time domain to windowed frequency domain;
a plurality of adaptive polynomial filters that are configured based on i) the microphone signal, ii) the linear EC corrected signal, or iii) a clean signal produced by an echo suppressor, wherein the adaptive polynomial filters are to adaptively filter the plurality of channels in the sub-band domain to generate an echo estimate wherein the adaptive polynomial filters in the sub-band domain are configured to receive and process the plurality of channels in the windowed frequency domain, and the adaptive polynomial filters are configured to generate the echo estimate in the windowed frequency domain,
a windowed frequency-time transformer to transform the echo estimate in the windowed frequency domain to time domain;
a non-linear echo canceller (EC) to remove the echo estimate from the linear EC corrected microphone signal, to generate an AEC output signal; and
an echo suppressor configured to remove a residual echo from the AEC output signal to generate the clean signal.

2. The system of claim 1, wherein the linear echo canceller (EC) is an adaptive linear EC or a fixed linear EC.

3. The system of claim 1, wherein the adaptive polynomial filters in the sub-band domain generate the echo estimate that estimates non-linear echo.

4. The system of claim 1, wherein the AEC comprises:
a combiner to generate the echo estimate by combining the time domain output of the windowed frequency-time transformer into a single echo estimate, and
to transmit the single echo estimate to the non-linear EC.

5. A method for echo control using adaptive polynomial filters in sub-band domain comprising:
outputting by a loudspeaker a loudspeaker signal, wherein the loudspeaker is configured to be driven by a reference signal;
receiving by a microphone at least one of: a near-end speaker signal, ambient noise signal, or the loudspeaker signal;
generating by the microphone a microphone signal;
cancelling by a linear echo canceller (EC) linear echo from the microphone signal to generate a linear EC corrected microphone signal;
creating a plurality of channels from the reference signal wherein each of the plurality of channels contains a nonlinear representation of the reference signal;
creating a sub-band domain representation of the plurality of channels by a windowed time-frequency transformer that transforms the plurality of channels from a time domain to windowed frequency domain;
adaptively filtering by a plurality of adaptive polynomial filters the plurality of channels in the sub-band domain to generate an echo estimate wherein the adaptive polynomial filters generate the echo estimate in the windowed frequency domain, wherein the adaptive filtering is configured in accordance with i) the microphone signal, ii) the linear EC corrected microphone signal, or iii) a clean signal produced by an echo suppressor;
a windowed frequency-time transformation to transform the echo estimate from the windowed frequency domain to time domain; and
removing by a non-linear echo canceller (EC) the echo estimate from the linear EC corrected microphone signal to generate an adaptive echo canceller, AEC, output signal.

6. The method of claim 5 wherein the linear echo canceller (EC) is an adaptive linear EC or a fixed linear EC.

7. The method of claim 5 further comprising
removing by an echo suppressor a residual echo from the AEC output signal to generate the clean signal, and wherein the adaptive polynomial filters in the sub-band domain generate the echo estimate that estimates non-linear echo.

8. The method of claim 5 wherein the echo estimate is generated by combining the time domain output of the windowed frequency-time transformation into a single echo estimate, and wherein
the single echo estimate is removed from the linear EC corrected microphone signal.

* * * * *